United States Patent Office 2,756,163
Patented July 24, 1956

2,756,163

RESINOUS LAYERS HAVING A SELECTED DEGREE OF WATER SENSITIVITY AND METHOD OF MAKING SAME

Clifford E. Herrick, Jr., Binghamton, N. Y., and William F. Amon, Jr., St. Paul, Minn., assignor to General Aniline & Film Corporation, New York, N. Y., a corporation of Delaware No Drawing. Application January 4, 1952, Serial No. 265,046

19 Claims. (Cl. 117—62)

This invention relates to a method of forming a resinous layer having a selected degree of water sensitivity by forming a compatible solvent solution of a hydrophobic resin such as cellulose acetate and a resinous copolymer of a vinyl compound such as vinyl methyl ether with an ethenoid dicarboxylic acid compound such as maleic anhydride, forming a layer therefrom on a support such as cellulose acetate, drying and then treating with a moist base. It also relates to the resulting resinous layer having a selected degree of water sensitivity.

For many technical applications, a water-sensitive resinous or collodial layer is required; i. e., a layer which swells in the presence of aqueous solutions without dissolving or becoming excessively weakened.

It has been proposed heretofore to coat a suitable support with a water solution of a colloid such as polyvinyl alcohol, gelatin, carboxyalkyl cellulose, casein, or the like, and subsequently treat the layer with a chemical reagent to insolubilize the collodial film to the desired degree. Such chemical reagents are typified by boric acid, ammonium bichromate, formaldehyde, metal salts containing chromium, iron, zinc, tin, copper, or the like. The resulting films are unsatisfactory for many applications. Films hardened with metal salts are unsuitable as carrier layers for certain light-sensitive diazo salts since they cause the latter to decompose.

It has also been proposed heretofore to surface-saponify cellulose acetate film in order to make it receptive to aqueous coating solutions, such as light-sensitive diazo salts. However, this surface-saponification is very difficult from the technical viewpoint, since it involves repeated application of a surface-saponifying solution together with an adequate washing procedure in order to remove excess caustic. The saponifying solution generally consists of an alkaline water-organic solvent mixture, and must be carefully controlled with respect to the concentration of all components throughout the treatment.

The art is confronted with the problem of providing a resinous layer or surface having a selected degree of water-sensitivity and free from the above-mentioned drawbacks.

It has been found, in accordance with the invention, that the above-mentioned drawbacks may be overcome and highly advantageous resinous layers having selected degrees of water-sensitivity may be prepared in a convenient manner.

The objects achieved in accordance with the invention as described herein include the provision of methods of forming resinous layers having selected degrees of water-sensitivity by forming a compatible solvent solution of a hydrophobic resin and a resinous copolymer of a vinyl compound with an ethenoid dicarboxylic acid compound, forming a layer therefrom, drying and then treating with a moist base; the provision of resinous layers having selected degrees of water-sensitivity, comprising a hydrophobic resin and a water-sensitive derivative of a compatible resinous copolymer of a vinyl compound and an ethenoid dicarboxylic acid compound, the layer being formed and then treated with a base to render it water-sensitive; and other objects which will be apparent as details or embodiments of the invention are set forth hereinafter.

In order to facilitate a clear understanding of the invention, the following preferred specific embodiments are described in detail:

Example 1

A lacquer solution was made as follows: 3.0 parts of vinyl methyl ether and maleic anhydride copolymer (parts by weight), 7.0 parts of cellulose acetate were dissolved in 9.5 parts of ethylene glycol monomethyl ether and 57 parts of acetone. The resulting solution was applied as a film both to glass and to paper, using a Bird type applicator and dried. The film of the lacquer on glass was essentially clear. The paper coating when subjected to water failed to swell appreciably. A similar paper coating was subjected to moist $NH_3$ fumes at about 180° F. for 20 seconds (to hydrolyze the acid anhydride portion of the maleic anhydride copolymer) and the resulting film swelled in water and had the soapy feeling typical of a swollen water-sensitive polymer. Unsaponified material of this kind takes up very little dye from a 0.025% solution of Methylene Blue, while a corresponding hydrolyzed sample takes up dye readily. The hydrolyzed layer is substantially insoluble in water. A cold (25° C.) 4% aqueous solution of NaOH can be used in place of gaseous ammonia for the hydrolysis step, and the hydrolysis may be carried out by applying the caustic solution to the resin surface for a few seconds. Cyclohexane, tetrahydrofuran, or dioxane can be substituted for acetone as a solvent; with the latter, the resulting film is somewhat less susceptible to $NH_3$ hydrolysis than the film cast from acetone, but responds well to NaOH hydrolysis.

Example 2

A lacquer solution was made as follows: 3.0 parts of vinyl methyl ether and maleic anhydride copolymer, and 7.0 parts of polyvinyl acetate were dissolved in 9.5 parts of ethylene glycol monomethyl ether and 57 parts of acetone. The resulting solution was applied as a film both to glass and to paper, using a Bird type applicator, and dried. The film of the lacquer on glass was essentially clear. The paper coating when subjected to water failed to swell appreciably. A similar paper coating was subjected to moist $NH_3$ fumes at about 180° F. for 20 seconds (to hydrolyze the acid anhydride portion of the maleic anhydride copolymer) and the resulting film swelled in water and had the soapy feeling typical of a swollen water-sensitive polymer. The unsaponified material takes up very little dye from a 0.025% solution of Methylene Blue, while the corresponding hydrolyzed material takes up dye readily. The hydrolyzed layer is substantially insoluble in water. Similar quantities of tetrahydrofuran or cyclohexanone can be substituted for acetone in this example. The films cast from tetrahydrofurane respond better to aqueous alkaline hydrolysis than to $NH_3$ gas hydrolysis.

Example 3

A lacquer solution was made as follows: 3.0 parts of the copolymer of isobutyl vinyl ether and maleic anhydride and 7.0 parts of polyvinyl acetate were dissolved in 9.5 parts of ethylene glycol monomethyl ether and 57 parts of acetone. The resulting solution was applied as a film, both on glass and on paper using a Bird applicator, dried and treated by the above method. The film of the lacquer on glass was essentially clear. The unhydrolyzed paper coating failed to swell in water while the hydrolyzed paper coating swelled appreciably without showing any detectable tendency to dissolve.

In place of acetone, the same amount of dioxane or cyclohexanone or methylethylketone can be used and the film of each of the lacquers appears essentially clear on glass. The film cast from acetone hydrolyzes with hot ammonia vapor while the films from dioxane and cyclohexanone hydrolyze well with aqueous caustic.

*Example 4*

A lacquer solution was made as follows: 3.0 parts of a copolymer of isobutyl vinyl ether and maleic anhydride and 7.0 parts of polyvinyl butyral were dissolved in 9.5 parts of ethylene glycol monomethyl ether and 98 parts of tetrahydrofuran. The resulting solution was applied as a film, both on glass and on paper using a Bird applicator, dried and treated by the above method. The film of the lacquer on glass was essentially clear. The unhydrolyzed paper coating failed to swell in water while the hydrolyzed coating swelled appreciably without showing any detectable tendency to dissolve. Dioxane or cyclohexanone can be used in place of tetrahydrofurane.

*Example 5*

A lacquer solution was made as follows: 3.0 parts of a copolymer of isobutyl vinyl ether and maleic anhydride and 7.0 parts of ethyl cellulose were dissolved in 9.5 parts of ethylene glycol monomethyl ether and 66 parts of cyclohexanone. The resulting solution was applied as a film both on glass and on paper using a Bird applicator, dried and treated by the above method. The film of the lacquer on glass was essentially clear. The unhydrolyzed paper coating failed to swell in water while the hydrolyzed coating swelled appreciably without showing any detectable tendency to dissolve. In place of butyl acetate, the same amount of methylethylketone can be used and the film of the lacquer is essentially clear.

*Example 6*

A lacquer solution was made as follows: 3.0 parts of 2-methoxyethyl vinyl ether-maleic anhydride copolymer and 7.0 parts of polyvinyl acetate were dissolved in 9.5 parts of ethylene glycol monomethyl ether and 57 parts of acetone. The resulting solution was applied as a film both on glass and on paper using a Bird applicator, dried and treated by the above method. The film of the lacquer on glass was essentially clear. The unhydrolyzed paper coating failed to swell in water while the hydrolyzed coating swelled appreciably without showing any detectable tendency to dissolve. In place of acetone, the same amount of methylethylketone, tetrahydrofuran, or cyclohexanone were used and the film of the lacquer appeared essentially clear. Aqueous caustic hydrolysis is preferable to ammonia hydrolysis with film coated from the last two solvents.

*Example 7*

A lacquer solution was made as follows: 3.0 parts of 2-methoxy ethyl vinyl ether-maleic anhydride copolymer and 7.0 parts of cellulose acetate were dissolved in 9.5 parts of ethylene glycol monomethyl ether and 98 parts of tetrahydrofuran. The resulting solution was applied as a film to glass and paper using a Bird applicator, dried and treated by the above method. The film of the lacquer on glass was essentially clear. The unhydrolyzed paper coating failed to swell in water, while the unhydrolyzed coating swelled appreciably without showing any detectable tendency to dissolve. In place of tetrahydrofuran, the same amount of dioxane can be used to give a film of the lacquer which is essentially clear. A caustic saponification is preferably with films cast from the latter solvent solution.

*Example 8*

A lacquer solution was made as follows: 3.0 parts of 2-methoxy ethyl vinyl ether maleic anhydride copolymer and 7.0 parts of polymerized methyl methacrylate (Lucite) were dissolved in 9.5 parts of ethylene glycol monomethyl ether and 66 parts of cyclohexanone. The resulting solution was applied as a film both on glass and on paper using a Bird applicator, dried and processed by the above method. The unhydrolyzed paper coating failed to swell in water while the hydrolyzed coating swelled appreciably without showing any detectable tendency to dissolve.

*Example 9*

A coating lacquer was made by dissolving 4.9 parts of polyvinylacetate and 0.86 part of vinyl acetate-maleic anhydride copolymer in 132 parts of tetrahydrofuran and coated both on glass and on paper, and treated by the above method. The unhydrolyzed paper coating failed to swell in water, while the hydrolyzed coating swelled appreciably.

*Example 10*

Plasticized films were coated on glass and paper from a solution containing the following proportions of material:

6.66 parts vinyl methyl ether-maleic anhydride copolymer
3.33 parts cellulose acetate
9.5 parts ethylene glycol monomethyl ether
0.5 part triphenyl phosphate
0.3 part methyl phthalyl ethyl glycollate
57 parts acetone The dried film resinous layer was hydrolyzed using hot moist ammonia fumes (and alternatively 4% cold NaOH) as in Example 1, and in the hydrolyzed state was water receptive though somewhat less so than a similar film without plasticizer. The plasticized layer was more pliable than the unplasticized layer.

*Example 11*

A film having the composition given in Example 1 was hydrolyzed using vapors of dimethylethanol amine. The hydrolyzed film was water receptive and showed good pick up of a dye from an aqueous solution, as described in Example 1.

*Example 12*

A coating lacquer was made by dissolving 3.0 parts of the copolymer of styrene and maleic anhydride and 8.5 parts of cellulose acetate in 160 parts of acetone. The lacquer was coated both on glass and on paper, and treated by the above method. The film on glass was nearly clear. The paper coating was hydrolyzed by ammonia and was thereafter water receptive. In place of acetone, an equivalent amount of tetrahydrofurane or methylethylketone can be used, and 5% aqueous caustic can be used for hydrolysis.

*Example 13*

A coating lacquer was made by dissolving 3.0 parts of the copolymer of styrene and maleic anhydride and 8.5 parts of polyvinyl acetate in 160 parts of acetone. The lacquer was coated both on glass and on paper. The film on glass was nearly clear. The paper coating was hydrolyzed by ammonia vapor and became water receptive. In place of acetone, an equivalent amount of tetrahydrofurane or methylethylketone can be used, and 5% aqueous caustic can be used for hydrolysis.

*Example 14*

A paper supported film of the composition given in Example 1 was hydrolyzed by subjecting the film surface to cold aqueous ammonia (28%) for a short time, doctoring off the excess ammonia and drying with hot warm air to remove uncombined water and ammonia, and it became water receptive.

This is a particularly advantageous way of carrying out an aqueous hydrolysis since an after-washing to remove excess alkalies is not required; with ammonia, the base and unbound reaction products are volatile. This procedure can be used in the other examples herein.

Comparable results to the foregoing are achieved by using the following variations: The support for the coatings may be either paper or the glass as already mentioned, or grained metal foil such as aluminum or zinc foil, fabrics, wood or a plastic film, such as cellulose acetate, cellulose acetate butyrate, "cellophane," nitrocellulose, polyvinyl alcohol, polymethylmethacrylate, and the like. The alkaline agent may be ammonia or alkali as already discussed, or a volatile base such as organic amines, caustic potash, alkaline salts and the like.

The hydrophobic resin may be any such resin or mixture of resins which is compatible with the copolymer material providing it remains essentially hydrophobic under the treatment by which the copolymer material is rendered hydrophilic or water sensitive. Copolymers of vinyl compounds with ethenoid dicarboxylic acid compounds are known. In general, they are thermoplastic solids and are made up from a ratio of about one mol of a monovinyl compound with about one mol of the ethenoid dicarboxylic acid compound; the latter may be maleic anhydride or a substituted maleic anhydride such as one containing a lower alkyl group, or the like. Mixtures of resins may be used, as may mixtures of the vinyl and of the ethenoid compounds in the copolymers.

The preferred molecular weight of the copolymer is such that a 1 gm. solution thereof in 100 gm. of 2-butanone has a specific viscosity of 3 at 25° C.; however, higher or lower molecular weights can be used, providing the copolymer is compatible in the desired proportions.

The proportions of resin and copolymer should be such as to give compatible compositions when dried, i. e., give a substantially clear layer or film. The degree of water-sensitivity of the resinous layer may be varied within the limits of compatibility of the resin and the copolymer, higher proportions of the latter giving materials having higher water-sensitivity. For instance, layers were prepared by the method of Example 1 wherein the ratio of the copolymer to the cellulose acetate was varied successively. At one extreme the ratio was 8 parts of the copolymer with 92 parts of the cellulose acetate, at the other, 60 parts of the copolymer to 40 parts of the cellulose acetate. The hydrolyzed layers showed an increase of water-sensitivity when the ratio of the copolymer was increased; this was demonstrated by the degree of take up of dye from the aqueous solution, as described in Example 1. At the lower proportions of copolymer, the increase in water-sensitivity is approximately proportionate to the increase in the ratio of copolymer. At proportions above about 25% (based upon the combined weight of the resin and copolymer), the rate of increase of water-sensitivity relative to the increase in copolymer ratio drops off, and in going from 50% to 60%, the increase in water-sensitivity is rather small.

In the broader aspects of the invention, the proportions may be an amount in the range of 5 to 1 parts of a thermoplastic, hydrophobic resin and an amount in the range of 1 to 6 parts of a hydrophilic derivative of a compatible resinous copolymer of about one mol of a vinyl compound and about one mol of an ethenoid dicarboxylic acid compound. The particular amounts selected for the particular resins are such as to give substantially clear layers upon drying, and to give the desired degree of water sensitivity. Where the resin and copolymer are substantially compatible in all proportions, the resinous composition may contain 1% or more of the copolymer up to 90% of the copolymer and the remainder hydrophobic resin. Other solvents for the resinous materials may be used in place of the ethylene glycol monomethylether as a co-solvent in the foregoing examples.

The layers produced in accordance with the foregoing examples using cellulose acetate film as the support are eminently suitable for replacing surface-saponified cellulose acetate in diazo-type materials. Such layers are also indicated for treating paper materials to provide them with a hydrophilic or water-sensitive resin surface. They may also be used as a means of bonding a hydrophobic layer to a hydrophilic layer.

Variations and modifications of the invention will be apparent to one skilled in the art in view of the foregoing disclosures, and it is intended to include within the invention all such modifications and variations except as do not come within the scope of the appended claims.

We claim:

1. A method of forming a resinous layer having a selected degree of water sensitivity which comprises forming a compatible solvent solution of a mixture of hydrophobic organic film-forming material and a resinous copolymer of about one mol of a vinyl compound with about one mol of a maleic acid compound, the proportions in said mixture being in the range of 1 to 90% of said copolymer and selected to give a substantially clear layer upon drying, coating said solution on a support, drying and treating with a moist base alkali until the resulting layer swells in water.

2. The method of claim 1 wherein the hydrophobic organic material is selected from the group consisting of cellulose acetate, nitro-cellulose, polyvinyl acetate, polyvinyl butyral, ethyl cellulose and polymethylmethacrylate.

3. The method of claim 2 wherein the hydrophobic organic material is cellulose acetate and the copolymer is of a vinyl ether and maleic anhydride.

4. The method of claim 3 wherein the ether is methyl vinyl.

5. The method of claim 3 wherein the ether is isobutyl vinyl.

6. The method of claim 3 wherein the ether is 2-methoxy-ethyl vinyl.

7. The method of claim 6 wherein the base is ammonia vapor.

8. The method of claim 2 wherein the hydrophobic organic material is polyvinyl acetate and the copolymer is of vinyl acetate and maleic anhydride.

9. The method of claim 2 wherein the hydrophobic organic material is polyvinyl acetate and the copolymer is of styrene and maleic anhydride.

10. The method of claim 2 wherein the hydrophobic organic material is polyvinyl butyral and the copolymer is of isobutyl vinyl ether and maleic anhydride.

11. A base carrying a resinous layer having a selected degree of water sensitivity comprising an amount in the range of 5 to 1 parts of a thermoplastic, hydrophobic organic film-forming colloidal material and an amount in the range of 1 to 6 parts of a hydrophilic derivative of a compatible hydrophobic resinous copolymer of about one mol vinyl compound and about one mol of a maleic acid compound, said hydrophilic derivative having been formed by coating said layer from a solvent solution, dyeing said layer and treating it with a moist alkali until the layer swells in water.

12. The material of claim 11 wherein the hydrophobic organic material is selected from the group consisting of cellulose acetate, nitrocellulose, polyvinyl acetate, polyvinyl butyral, ethyl cellulose and polymethylmethacrylate.

13. The material of claim 12 wherein the hydrophobic organic material is cellulose acetate and the copolymer is of a vinyl ether and maleic anhydride.

14. The material of claim 13 wherein the ether is methyl vinyl.

15. The material of claim 13, wherein the ether is isobutyl vinyl.

16. The method of claim 13 wherein the ether is 2-methoxyethyl vinyl.

17. The material of claim 12 wherein the hydrophobic organic material is polyvinyl acetate and the copolymer is of vinyl acetate and maleic anhydride.

18. The material of claim 12 wherein the hydrophobic organic material is polyvinyl acetate and the copolymer is of styrene and maleic anhydride.

19. The material of claim 12 wherein the hydrophobic organic material is polyvinyl butyral and the copolymer is of isobutyl vinyl ether and maleic anhydride.

References Cited in the file of this patent

UNITED STATES PATENTS

| | | |
|---|---|---|
| 2,215,196 | Schlack | Sept. 17, 1940 |
| 2,329,456 | Campbell | Sept. 14, 1943 |
| 2,565,147 | Pfluger | Aug. 21, 1951 |

OTHER REFERENCES

"Chemistry of Synthetic Resins," Ellis, volume 1, 1935, page 13.